A. B. DE VORE.
Hog Traps.

No. 140,816.

Patented July 15, 1873.

Witnesses:

Inventor:
A. B. De Vore
Per Munn & Co
Attorneys.

UNITED STATES PATENT OFFICE.

AARON B. DE VORE, OF TALKINGTON TOWNSHIP, SANGAMON COUNTY, ILLINOIS.

IMPROVEMENT IN HOG-TRAPS.

Specification forming part of Letters Patent No. 140,816, dated July 15, 1873; application filed May 31, 1873.

*To all whom it may concern:*

Be it known that I, AARON B. DE VORE, of Talkington township, in the county of Sangamon and State of Illinois, have invented a new and Improved Hog-Controller, of which the following is a specification:

My invention is an improvement in a crib or stocks for holding or confining hogs. The bottom inclines downwardly toward the head-lock and falls considerably below the front beam, so as not to afford a foot-rest by which the hogs can push back and pull out of the lock. For small shotes a secondary pen or crib is arranged in the large one to contract the space suitably for them. A door is arranged on the top to afford access in that way when desired.

Figure 1:
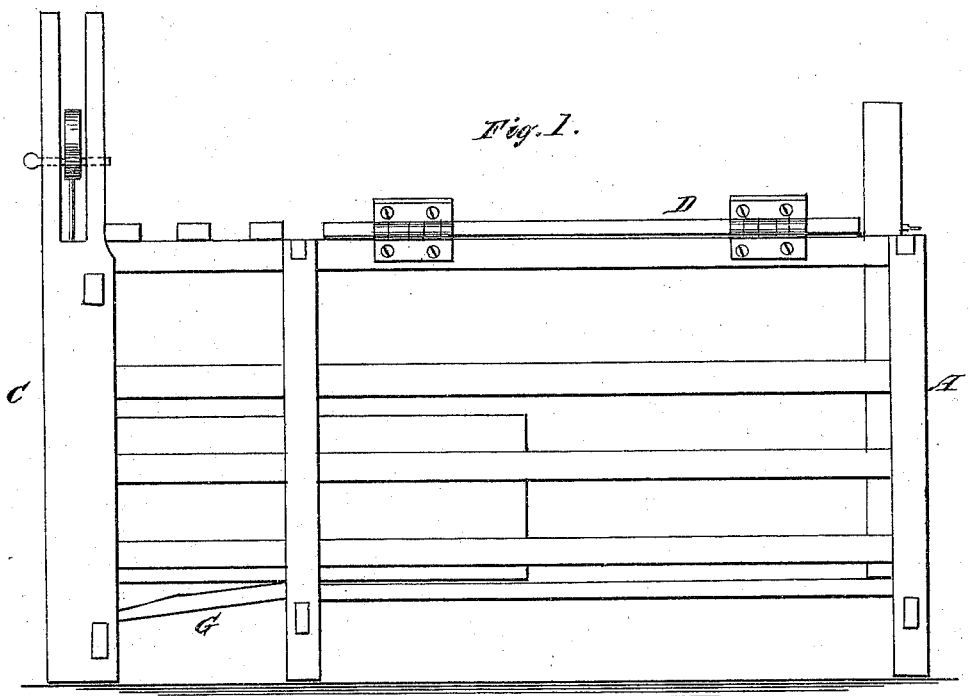
Figure 2:
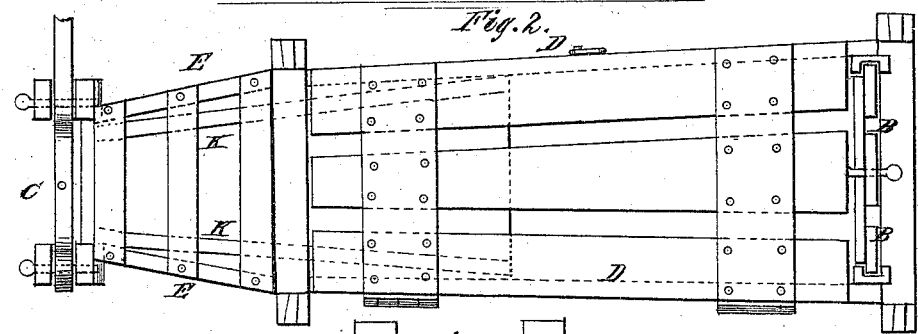
Figure 3:
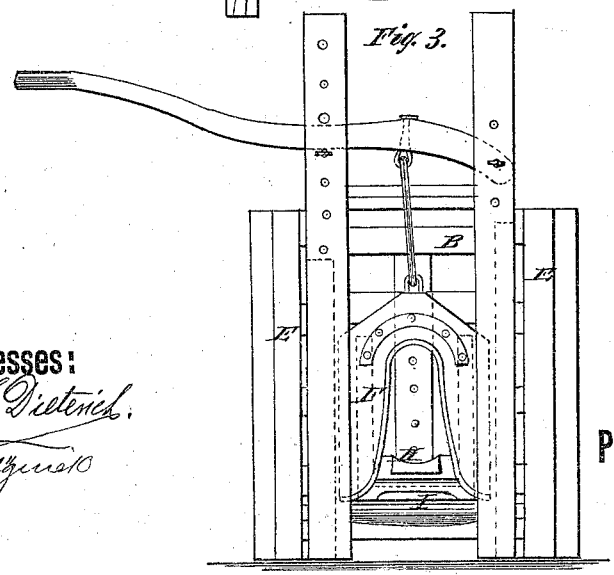

Figure 1 is a side elevation of my improved hog-controller. Fig. 2 is a plan view, and Fig. 3 is an end elevation.

I make a small crib, just about large enough to admit a large hog at the wide end A through a vertically-sliding door, B, at the other end c, which is made considerably narrower than the end A by the contracting of the sides C' D. I leave an opening through which the hog can extend his head; and at this opening I have the vertically-sliding head-lock F, which drops down on the neck and holds the animal fast with the nose projecting, so that a ring can be readily inserted. The lock, together with the sides of the crib, also holds him so that the operation of castration can be readily performed. For this the crib will be turned down on the side after the animal has been secured. The bottom of the crib descends at G, below the rest H, so that an open space, I, allows the fore feet to slip through, so that the animal is prevented from pushing himself back. K is the small inner crib that may be used to contract the space for small hogs. Small hogs may be allowed to escape under the lock when raised up, but large ones will back out at the entrance.

Having thus described my invention, I claim as new and desire to secure by Letters Patent—

1. The crib constructed and arranged as described, and provided with the inclined bottom G, and open space under the neck-rest H, substantially as specified.

2. The combination, with a crib such as herein described, of an interior auxiliary crib, substantially as specified.

AARON B. DE VORE.

Witnesses:
BYRON L. CARTER,
F. H. WEMPLE.